(12) United States Patent
Chilikin et al.

(10) Patent No.: US 11,483,245 B2
(45) Date of Patent: Oct. 25, 2022

(54) TECHNOLOGIES FOR FILTERING NETWORK TRAFFIC ON INGRESS

(71) Applicant: Intel Corporation, Santa Clara, CA (US)

(72) Inventors: Andrey Chilikin, Limerick (IE); Ronen Aharon Hyatt, Haifa (IL); Vadim Sukhomlinov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 16/131,007

(22) Filed: Sep. 13, 2018

(65) Prior Publication Data

US 2019/0044866 A1     Feb. 7, 2019

(51) Int. Cl.
*H04L 45/74*     (2022.01)
*H04L 47/20*     (2022.01)
(Continued)

(52) U.S. Cl.
CPC .......... *H04L 47/20* (2013.01); *H04L 12/4645* (2013.01); *H04L 45/38* (2013.01); *H04L 47/2408* (2013.01); *H04L 49/30* (2013.01); *H04L 69/04* (2013.01); *H04L 69/22* (2013.01); *H04L 47/2441* (2013.01)

(58) Field of Classification Search
CPC . H04L 12/4645; H04L 12/54; H04L 12/5602; H04L 29/06095; H04L 29/0653; H04L 45/38; H04L 45/74; H04L 47/10; H04L 47/20; H04L 47/2408; H04L 47/2441; H04L 47/30; H04L 47/32; H04L 47/35; H04L 49/252; H04L 49/30; H04L 49/3009; H04L 49/309; H04L 69/04;
(Continued)

(56) References Cited

U.S. PATENT DOCUMENTS 6,658,002 B1 * 12/2003 Ross ...................... H04L 45/50
370/392
7,386,525 B2 * 6/2008 Nurmela ............. H04L 63/0227
706/47
(Continued)

FOREIGN PATENT DOCUMENTS

EP     1163777     12/2001

OTHER PUBLICATIONS

Extended European search report for European patent application No. 19191514.9, dated Dec. 12, 2019 (9 pages).

*Primary Examiner* — Frank Duong
(74) *Attorney, Agent, or Firm* — Compass IP Law, PC

(57) ABSTRACT

Technologies for filtering network traffic on ingress include a network interface controller (NIC) configured to parse a header of a network packet received by the NIC to extract data from a plurality of header fields of the header. The NIC is additionally configured to determine an input set based on the field vector, retrieve a matching list from a plurality of matching lists, and compare the input set to each of the plurality of rules to identify a matching rule of the plurality of rules that matches a corresponding portion of the input set. The NIC is further configured to perform an action on the network packet based on an actionable instruction associated with the one of the plurality of rules that matches the corresponding portion of the input set. Other embodiments are described herein.

23 Claims, 4 Drawing Sheets

(51) Int. Cl.
   *H04L 69/22*      (2022.01)
   *H04L 47/2408*    (2022.01)
   *H04L 12/46*      (2006.01)
   *H04L 49/00*      (2022.01)
   *H04L 69/04*      (2022.01)
   *H04L 45/00*      (2022.01)
   *H04L 47/2441*    (2022.01)

(58) Field of Classification Search
   CPC ............... H04L 69/22; H04L 2012/54; H04L 2012/5636; H04L 2012/5632
   See application file for complete search history.

(56) References Cited

U.S. PATENT DOCUMENTS

| | | | |
|---|---|---|---|
| 7,724,740 B1* | 5/2010 | Wang | H04L 29/0653 |
| | | | 370/392 |
| 7,760,733 B1 | 7/2010 | Eiriksson et al. | |
| 8,856,203 B1 | 10/2014 | Schelp et al. | |
| 11,038,993 B2* | 6/2021 | Goel | H04L 45/7453 |
| 2009/0190592 A1* | 7/2009 | Hsieh | H04L 45/48 |
| | | | 370/392 |
| 2012/0281714 A1* | 11/2012 | Chang | H04L 49/3009 |
| | | | 370/465 |
| 2017/0063690 A1* | 3/2017 | Bosshart | H04L 69/22 |

* cited by examiner

TECHNOLOGIES FOR FILTERING NETWORK TRAFFIC ON INGRESS

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device and the resulting packet transmitted, via a transmission device (e.g., a network interface controller (NIC) of the computing device), to another computing device over a network.

Upon receipt of a network packet, the computing device typically performs some level of examination (e.g., using filters) on at least a portion of the received network packet to determine what, if any, operations (e.g., drop the network packet, process/store at least a portion of the network packet, forward the network packet, etc.) are to be performed by the computing device. However, different types of network packets often require different types of filters. For example, control plane packets and data plane packets can be distinguished by multiple parameters. For example, the different network packet types will typically be on different virtual local area networks (VLANs), have different differentiated services code point (DSCP) and/or type of service (TOS) values in the Internet protocol (IP) headers, and/or may be separated by different layer 4 (e.g., L4 of the Open Systems Interconnection (OSI) model) destinations ports. However, performing control/data plane separation in software generally requires a significant number of processor clock cycles for packet parsing and classification, and expensive hardware filters (e.g., ternary content-addressable memory (TCAM) hardware filters) are typically required to offload such classification to the network interface controller (NIC).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
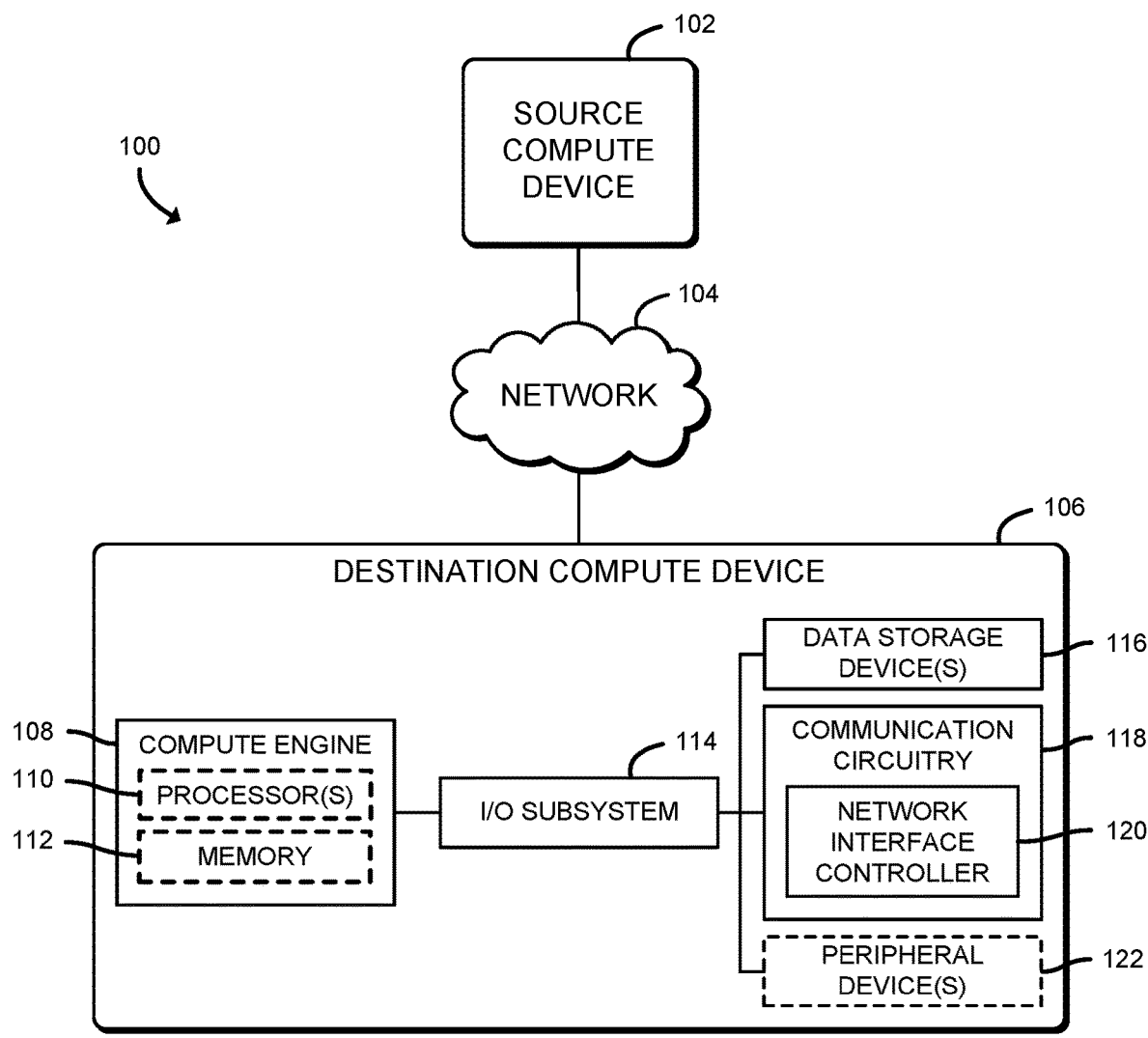
FIG. 1 is a simplified block diagram of at least one embodiment of a system for filtering network traffic on ingress that includes a source compute device and a destination compute device communicatively coupled via a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for filtering network traffic on ingress includes a source compute device 102 communicatively coupled to a destination compute device 106 via a network 104. While illustratively shown as having a single source compute device 102 and a single destination compute device 106, the system 100 may include multiple source compute devices 102 and multiple destination compute devices 106, in other embodiments. It should be appreciated that the source compute device 102 and destination compute device 106 have been illustratively designated herein as being one of a "source" and a "destination" for the purposes of providing clarity to the description and that the source compute device 102 and/or the destination compute device 106 may be capable of performing any of the functions described herein. It should be further appreciated that the source compute device 102 and the destination compute device 106 may reside in the same data center or high-performance computing (HPC) environment. In other words, the source compute device 102 and destination compute device 106 may reside in the same network 104 connected via one or more wired and/or wireless interconnects.

In use, the source compute device 102 and the destination compute device 106 transmit and receive network traffic (e.g., network packets, frames, bit streams, etc.) to/from each other, as well as other compute devices in the network 104, as applicable. For example, the destination compute device 106 may receive a network packet from the source compute device 102. Upon receipt of a network packet, the destination compute device 106, or more particularly a network interface controller (NIC) 120 of the destination compute device 106, performs analysis on the data associated with the received network traffic to identify a subsequent action, such as further analysis and/or processing of the network traffic data. The analysis includes applying a filter to at least a portion of the data associated with the received network traffic to identify the subsequent action. Accordingly, the subsequent action can be identified based on matching data relative to the filter.

Figure 4:
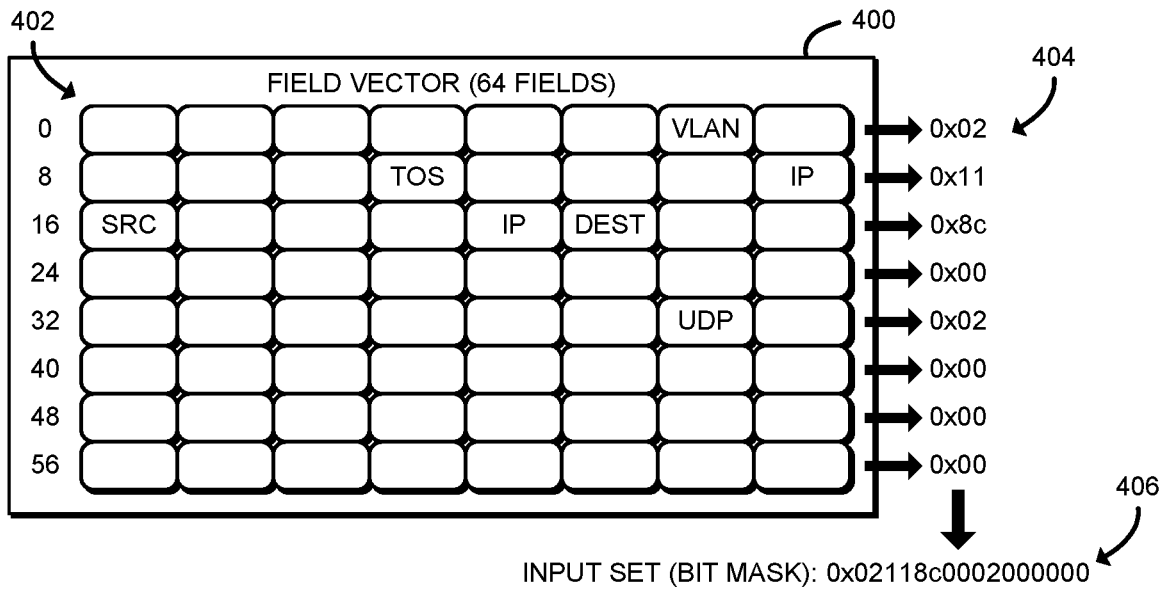
FIG. 4 is a simplified block diagram of at least one embodiment of a field vector.

However, unlike traditional filters, which implement either exact match classification (e.g., the filter must match exactly or the filtering fails) or ternary classification (e.g., using expensive ternary classification hardware, such as ternary content-addressable memory (TCAM) hardware filters), the NIC 120 is configured to extract data fields from the received network traffic to populate a field vector of data fields (see, e.g., the illustrative 64-field field vector 400 of FIG. 4). To do so, as will be described in further detail below, the NIC 120 is configured to identify a type associated with a received network packet (e.g., a control plane-based network packet, a data plane-based network packet, etc.) and retrieve a set of predefined rules that indicate which data is to be extracted from the received network packet. For example, the NIC 120 may extract the data from one or more header fields of the received network packet, as well as at certain offsets in the payload of the received network packet. The NIC 120 is further configured to parse at least a portion of the received network packet to extract the indicated data and insert each extracted data into a corresponding portion of a field vector.

Upon having populated the field vector with the extracted data, the NIC 120 is configured to determine an input set based on the populated field vector (see, e.g., the input set 406 of FIG. 4). The NIC 120 is further configured to receive or otherwise retrieve a matching list (e.g., a filter) that includes multiple rules (see, e.g., the matching list 500 of FIG. 5) and compare each rule of the matching list, in order, against the input set to identify a match. In other words, each rule includes data usable to match against the input set that determines whether the received network packet matches the rule. Depending on the embodiment, the matching list may be received/retrieved from local software of the destination compute device 106, a network controller/orchestrator, or some other policy controlling entity. If the NIC 120 determines that a rule has been matched, the NIC 120 takes a subsequent action on the received network packet based on an actionable instruction associated with the rule(s). It should be appreciated that, depending on the embodiment, the NIC 120 may be configured to compare the input set against each rule until each rule in the matching list has been compared against the input set, or find the first rule and exit the comparison.

The destination compute device 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart NIC (e.g., a host fabric interface (HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system. As shown in FIG. 1, the illustrative destination compute device 106 includes a compute engine 108, an I/O subsystem 114, one or more data storage devices 116, communication circuitry 118, and, in some embodiments, one or more peripheral devices 122. It should be appreciated that the destination compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may otherwise be embodied as, one or more processors 110 (i.e., one or more central processing units (CPUs)) and memory 112.

The processor(s) 110 may be embodied as any type of processor(s) capable of performing the functions described herein. For example, the processor(s) 110 may be embodied as one or more single-core processors, multi-core processors, digital signal processors (DSPs), microcontrollers, or other processor(s) or processing/controlling circuit(s). In some embodiments, the processor(s) 110 may be embodied as, include, or otherwise be coupled to an FPGA (e.g., reconfigurable circuitry), an ASIC, reconfigurable hardware or hardware circuitry, or other specialized hardware to facilitate performance of the functions described herein.

The memory 112 may be embodied as any type of volatile or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the destination compute device 106 via the I/O subsystem 114, which may be embodied as circuitry and/or components to facilitate input/output operations with the processor 110, the memory 112, and other components of the destination compute device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a SoC and be incorporated, along with one or more of the processor 110, the memory 112, and other components of the destination compute device 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the destination compute device 106 and other computing devices, such as the source compute device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the destination compute device 106, etc.), performing computational functions, etc.

In some embodiments, performance of one or more of the functions of communication circuitry 118 as described herein may be performed by specialized circuitry, hardware, or combination thereof of the communication circuitry 118, which may be embodied as a SoC or otherwise form a portion of a SoC of the destination compute device 106 (e.g., incorporated on a single integrated circuit chip along with a processor 110, the memory 112, and/or other components of the destination compute device 106). Alternatively, in some embodiments, the specialized circuitry, hardware, or combination thereof may be embodied as one or more discrete processing units of the destination compute device 106, each of which may be capable of performing one or more of the functions described herein.

The illustrative communication circuitry 118 includes the NIC 120, which may also be referred to as a host fabric interface (HFI) in some embodiments (e.g., high performance computing (HPC) environments). The NIC 120 may be embodied as any type of firmware, hardware, software, or any combination thereof that facilities communications access between the destination compute device 106 and a network (e.g., the network 104). In other words, it should be appreciated that the NIC 120 can be any type of interface to build a network (e.g., InfiniBand®, Intel® Omni-Path, etc.). For example, the NIC 120 may be embodied as one or more add-in-boards, daughtercards, network interface cards, controller chips, chipsets, or other devices that may be used by the destination compute device 106 to connect with another compute device (e.g., the source compute device 102).

In some embodiments, the NIC 120 may be embodied as part of a SoC that includes one or more processors, or included on a multichip package that also contains one or more processors. Additionally or alternatively, in some embodiments, the NIC 120 may include one or more processing cores (not shown) local to the NIC 120. In such embodiments, the processing core(s) may be capable of performing one or more of the functions described herein. In some embodiments, the NIC 120 may additionally include a local memory (not shown). In such embodiments, the local memory of the NIC 120 may be integrated into one or more components of the destination compute device 106 at the board level, socket level, chip level, and/or other levels. While not illustratively shown, it should be appreciated that the NIC 120 typically includes one or more physical ports (e.g., for facilitating the ingress and egress of network traffic) and, in some embodiments, one or more accelerator (e.g., ASIC, FPGA, etc.) and/or offload hardware components for performing/offloading certain network functionality and/or processing functions (e.g., a DMA engine).

The one or more peripheral devices 122 may include any type of device that is usable to input information into the destination compute device 106 and/or receive information from the destination compute device 106. The peripheral devices 122 may be embodied as any auxiliary device usable to input information into the destination compute device 106, such as a keyboard, a mouse, a microphone, a barcode reader, an image scanner, etc., or output information from the destination compute device 106, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the destination compute device 106 may depend on, for example, the type and/or intended use of the destination compute device 106. Additionally or alternatively, in some embodiments, the peripheral devices 122 may include one or more ports, such as a USB port, for example, for connecting external peripheral devices to the destination compute device 106.

The source compute device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that source compute device 102 includes similar and/or like components to those of the illustrative destination compute device 106. As such, figures and descriptions of the like/similar components are not repeated herein for clarity of the description with the understanding that the description of the corresponding components provided above in regard to the destination compute device 106 applies equally to the corresponding components of the source compute device 102. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the destination compute device 106 and the source compute device 102, which are not shown to preserve clarity of the description.

Figure 2:
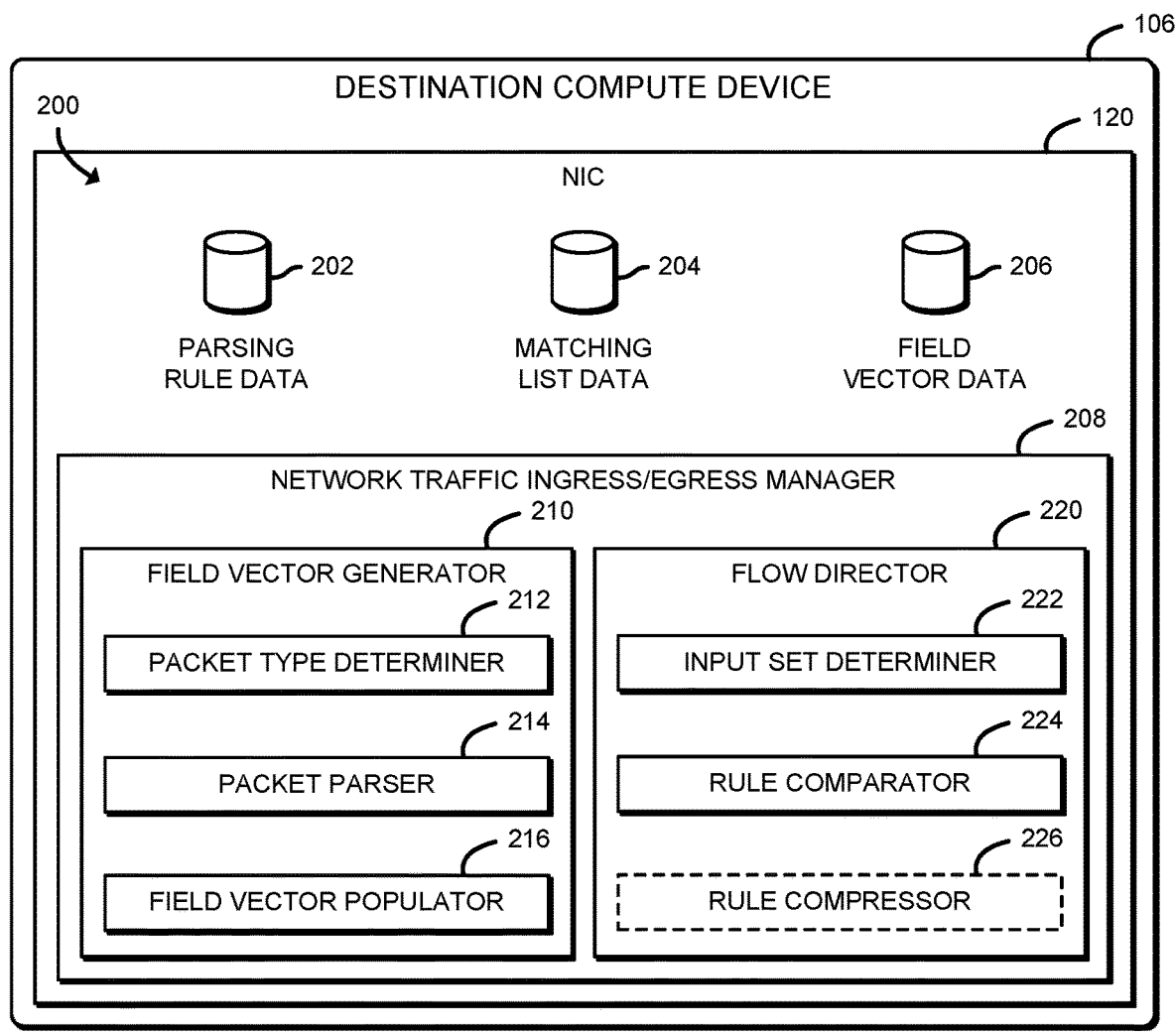
FIG. 2 is a simplified block diagram of at least one embodiment of an environment of the destination compute device of the system of FIG. 1.

Referring now to FIG. 2, in use, the destination compute device 106 establishes an environment 200 during operation. The illustrative environment 200 includes a network traffic ingress/egress manager 208 that includes a field vector generator 210 and a flow director 220. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 208, field vector generation circuitry 210, flow director circuitry 220, etc.). As illustratively shown, the network traffic ingress/egress management circuitry 208, the field vector generation circuitry 210, and the flow director circuitry 220 form a portion of the NIC 120. However, it should be appreciated that, in other embodiments, one or more functions described herein as being performed by the network traffic ingress/egress management circuitry 210, the field vector generation circuitry 210, and/or the flow director circuitry 220 may be performed, at least in part, by one or more other components of the destination compute device 106, such as the compute engine 108, the I/O subsystem 114, and/or other components of the destination compute device 106.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the NIC 120, the compute engine 108, and/or other software/hardware components of the destination compute device 106. It should be appreciated that the destination compute device 106 may include other components, sub-components, modules, sub-modules, logic, sub-logic, and/or devices commonly found in a computing device (e.g., device drivers, interfaces, etc.), which are not illustrated in FIG. 2 for clarity of the description.

In the illustrative environment 200, the destination compute device 106 additionally includes parsing rule data 202, matching list data 204, and field vector data 206, each of which may be accessed by the various components and/or sub-components of the destination compute device 106. Further, each of the parsing rule data 202, the matching list data 204, and the field vector data 206 may be accessed by the various components of the destination compute device 106. Additionally, it should be appreciated that in some embodiments the data stored in, or otherwise represented by, each of the parsing rule data 202, the matching list data 204, and the field vector data 206 may not be mutually exclusive relative to each other. For example, in some implementations, data stored in the parsing rule data 202 may also be stored as a portion of one or more of the matching list data 204 and/or the field vector data 206, or in another alternative arrangement. As such, although the various data utilized by the destination compute device 106 is described herein as particular discrete data, such data may be combined, aggregated, and/or otherwise form portions of a single or multiple data sets, including duplicative copies, in other embodiments.

The network traffic ingress/egress manager 208, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 208 is configured to facilitate inbound network communications (e.g., network traffic, network packets, network flows, etc.) to the destination compute device 106. Accordingly, the network traffic ingress/egress manager 208 is configured to manage (e.g., create, modify, delete, etc.) connections to physical and virtual network ports (i.e., virtual network interfaces) of the destination compute device 106 (e.g., via the communication circuitry 118), as well as the ingress buffers/queues associated therewith.

The network traffic ingress/egress manager 208 is additionally configured to classify the received network traffic based on rules associated with a given matching list. To do so, as noted previously, the illustrative network traffic ingress/egress manager 208 includes the field vector generator 210 and the flow director 220. The illustrative field vector generator 210 includes a packet type determiner 212, a packet parser 214, and a field vector populator 216.

The packet type determiner 212 is configured to determine a type of a received network packet, such as may be based on a particular flow or workload associated with the network packet, a source or destination of the network packet, a protocol associated with the network packet, etc. To do so, the packet type determiner 212 is configured to identify a characteristic of the network packet. The network packet characteristic may include any type of data associated with the network packet that is usable to identify the headers of the network packet. It should be appreciated that the length and format of network packets varies between networks and between network packets. The basic structure of a network packet includes one or more headers, a payload, and an optional trailer. At each step of encapsulation (e.g., at the source compute device 102), an identifier included in the header identifies the type of data subsequent to the header, which may be used to by the packet type determiner 212 to determine a type of the network packet.

The packet parser 214 is configured to parse data from each received network packet. In other words, the packet parser 214 is configured to identify and extract the appropriate fields in a header of the received network packets. To do so, the packet parser is configured to identify a set of parsing rules based on the network packet type (e.g., as determined by the packet type determiner 212). The parsing rules may include any instruction that is usable by the packet parser 214 to identify which header fields are to be extracted and the location in which those header fields reside in the header. In some embodiments, the parsing rules (e.g., the instructions associated therewith, a mapping between the instructions and the network packet type, the header field information, etc.) may be stored in the parsing rule data 202.

The field vector populator 216 is configured to populate a field vector corresponding to the received network packet. To do so, the field vector populator 216 is configured to insert the extracted fields into the appropriate location in the field vector. Accordingly, the field vector populator 216 is configured to identify a type of the extracted data, determine an appropriate location in the field vector corresponding to the identified type of the extracted data, and insert the extracted data into the determined appropriate location. It should be appreciated that the data associated with the extracted fields (e.g., in accordance with the parsing rules that correspond to the packet type) is inserted by the field vector populator 216 into the field vector. In some embodiments, the populated field vector (i.e., the extracted data inserted into the field vector) may be stored in the field vector data 206.

The illustrative flow director includes an input set determiner 222, a rule comparator 224, and, in some embodiments, a rule compressor 226. The input set determiner 222 is configured to determine an input set for each received network packet based on a corresponding field vector (e.g., as may be populated by the field vector populator 216). The input set determiner 222 may be configured to determine the input set based the network packet type (e.g., as may be determined by the packet type determiner 212). In some embodiments, the input set determiner 222 may be configured to determine the input set as a bit mask (see, e.g., the illustrative 64-bit mask input set 406 of FIG. 4). Additionally or alternatively, in some embodiments, the input sets may be stored in the field vector data 206.

The rule comparator 224 is configured to compare each rule of a matching list (e.g., a filter) to the input set. It should be appreciated that each matching list includes multiple rules. Accordingly, the rule comparator 224 is configured to identify the matching list from a set of matching lists (e.g., based on the determined network packet type) and compare each rule of the matching list, in order, to the input set. Depending on the embodiment, the rule comparator 224 may be configured to compare each rule until a match is detected, or compare every rule of the matching list and identify each matching rule.

Additionally, the rule comparator 224 is configured to take an action based on a matched rule, or more particularly based on an actionable instruction associated with the matched rule. For example, one such action may include setting metadata of the network packet or a respective descriptor field with a unique identifier of a matching rule or index of the matched rule relative to the matching set. In some embodiments, information associated with the matching list (e.g., the matching lists and associated rules) and/or the matched rules may be stored in the matching list data 204.

The rule compressor 226 is configured to compress each of the rules of the matching lists. To do so, the rule compressor 226 may be configured to compress the rules at bit-level. As illustratively shown in FIG. 4, the field vector 400 has 64 fields 402. It should be appreciated that, typically, only a subset of the fields 402 can be used as an input set. As illustratively shown, the fields 402 having an index of 7, 11, 15, 16, 20, 21, and 38 have been populated. As illustratively shown in FIG. 4, the input set 406 is embodied as a bit mask having seven bits set with the following value: 0x02118c0002000000. However, it should be further appreciated that some NIC 120 embodiments cannot handle 64 fields. Accordingly, the rules need to be compressed. In an illustrative example in which the NIC 120 cannot handle more than 24 fields, the rules can be compressed to a 24-bit value by mapping bits in the original input set to a compressed input set. For example, bit 0 of the compressed input set will represent matching on the highest bit of the original input set, bit 1 of the compressed input set will represent matching on the second highest bit of the original input set, and so on.

Figure 5:
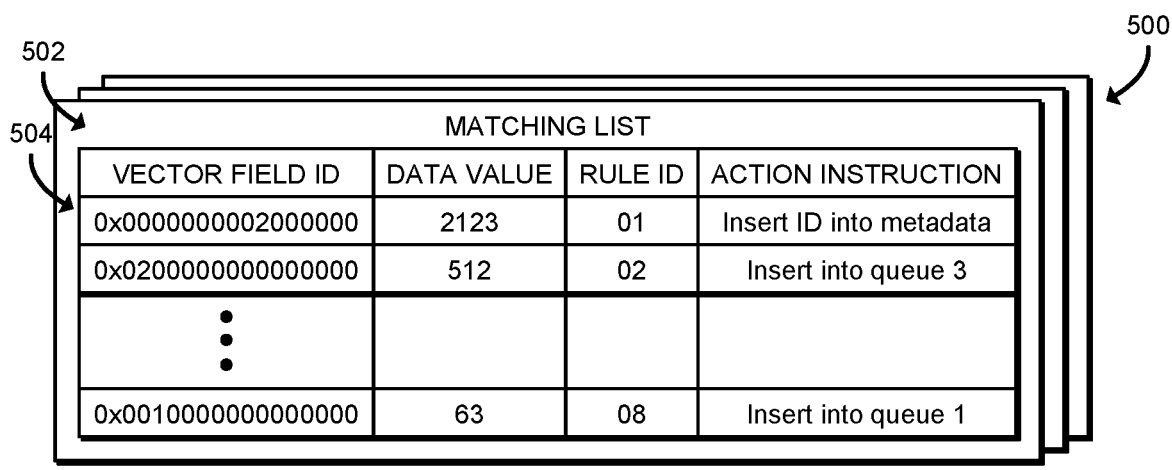
FIG. 5 is a simplified block diagram of at least one embodiment of a matching list set that includes multiple rules.

An illustrative set of rules 504 of a matching list 502 of a set of matching lists 500 is shown in FIG. 5. For example, assuming matching data on a first rule 504 (e.g., 0x0000000002000000), the compressed input set will be represented as 0x000001. Similarly, matching data on a second rule 504 (e.g., 0x0200000000000000) will be represented as 0x000002, matching on a third rule 504 (e.g., 0x0010000000000000) will be represented as 0x000004, and so on, while matching on all fields will be represented as 0x00007f.

Referring back to FIG. 2, in some embodiments, the rule compressor 226 may expose an application programming interface (API) to define fields for matching (e.g., specific bit ranges which identify fields). For example, two bit sets can be defined, the first bit set including bits 0 through 15 and the second bit set including bits 62 through 90. As such, the rule bits 0 through 15 of the rule will correspond to bits 0 through 15 of packet, and bits 16 through 43 of the rule will correspond to bits 62 through 90 of the packet. Accordingly, such compression can lower the silicon footprint and reduce the operating power of the NIC 120.

The rule compressor 226 may be additionally configured to compress the rules at the matching set level, in some embodiments, such as in those embodiments in which the required number of rules exceeds capabilities of the hardware of the NIC 120. In such embodiments, the rule compressor 226 may be configured to solve for "M" based on a ratio of "X" using the following equation for "M" in which M=[(X+(N'−1))/N']+1; wherein "X" is a number of matching sets which have to be recognized; wherein "N'" is equal to a maximum number of hardware supported rules for a defined matching set; wherein "[ ]" denotes integer part (e.g., [1.6]=1); and for the matching set of "X" rules, a perfect hash is computed by the rule compressor 226. It should be appreciated that some other restrictions can be set to make "M" closer to power of 2, which might require an adjustment of "N'".

For example, the rule compressor 226 may be configured to compute "M" on defined parts of packets and put the resulting value into metadata of the identifier of a matched rule. It should be appreciated that software can use this identifier to lookup only one of "M" elements, as perfect hashing should guarantee uniform distribution of keys. Accordingly, software tables can be built that for every key "Ki" out of "X", the hash "(Ki)" can be computed and "Ki" should be added to proper bucket. Alternative, the rule compressor 226 may be configured to use matching such that software will transform "X" rules into "N'" rules by finding common subexpressions in a balanced binary tree, and drop leafs up to some level, but also ensure not more than "M" is dropped.

In some embodiments, the rule compressor 226 may be configured to adjust the matching set by dropping some bits that are uniformly distributed among keys (e.g., closest frequency of '0' and '1' values). Accordingly, those bits can be dropped from hardware matching. It should be appreciated that "k" keys would need to be dropped, such that X/2^k is less than or equal to "N". It should be further appreciated that a smart partitioning of rules between hardware and software of the NIC 120 can place the rules with most frequent hits in the hardware for faster processing, wherein the rules with the less frequent hits can be handled by software.

Additionally, the network traffic ingress/egress manager 208 is configured to facilitate outbound network communications (e.g., network traffic, network packet streams, network flows, etc.) from the destination compute device 106. To do so, the network traffic ingress/egress manager 208 is configured to manage (e.g., create, modify, delete, etc.) connections to physical and virtual network ports/interfaces of the destination compute device 106 (e.g., via the communication circuitry 118), as well as the egress buffers/queues associated therewith. In some embodiments, at least a portion of the network packet (e.g., at least a portion of a header of the network packet, at least a portion of a payload of the network packet, at least a portion of a footer of the network packet, etc.) may be stored in the network packet data 202. Additionally or alternatively, in some embodiments, information about the network packet (e.g., a flow/workload type of the network packet, a source of the network packet, a destination of the network packet, a protocol associated with the network packet, etc.) may be stored in the network packet data 204.

Figure 3:
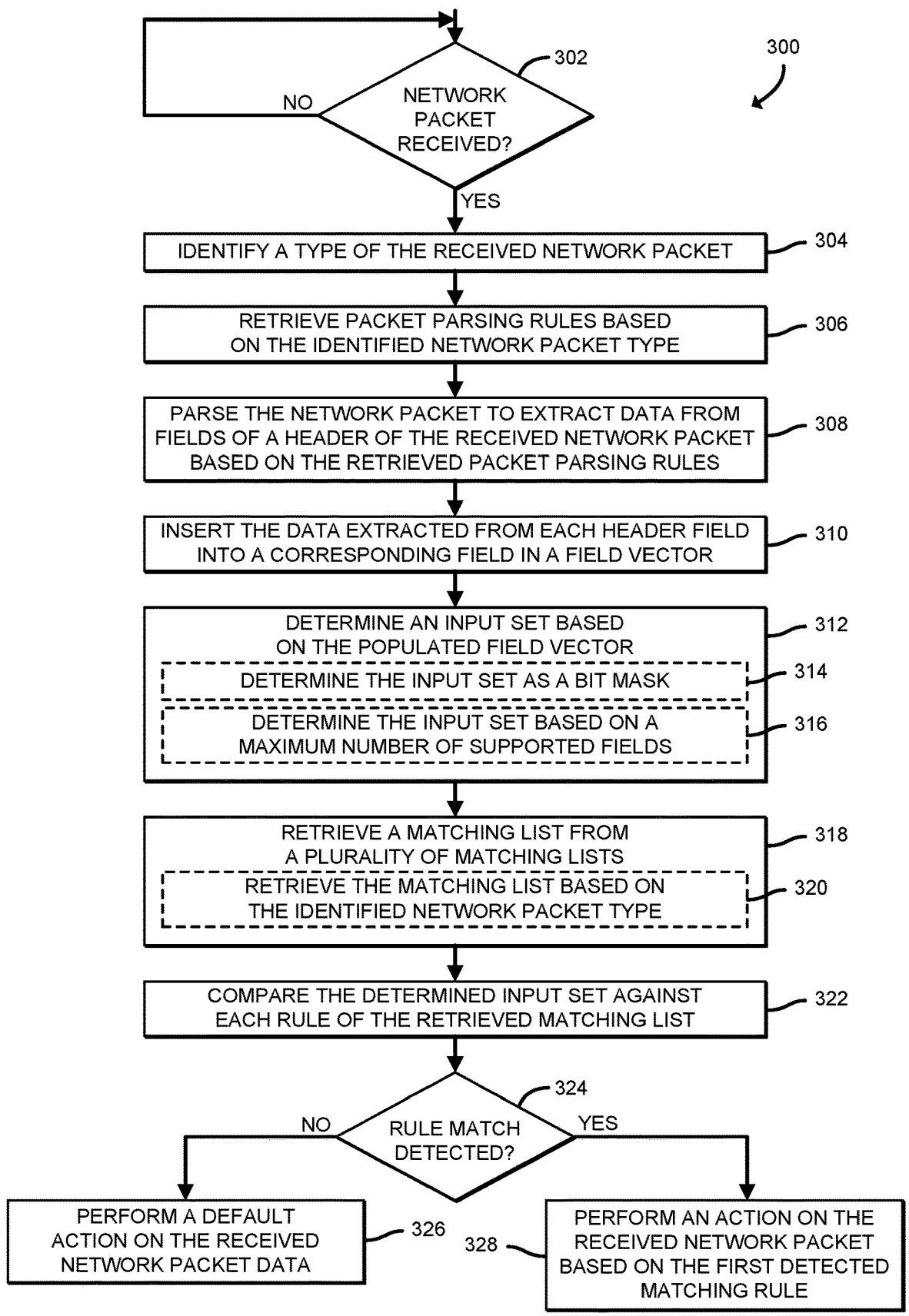
FIG. 3 is a simplified flow diagram of at least one embodiment of a method for filtering network traffic on ingress that may be executed by the destination compute device of FIGS. 1 and 2.

Referring now to FIG. 3, a method 300 for filtering network traffic on ingress is shown which may be executed the destination compute device 106, or more particularly by the NIC 120 of the destination compute device 106. The method 300 begins with block 302, in which the NIC 120 determines whether a network packet has been received. If so, the method 300 advances to block 304, in which the NIC 120 identifies a type of the received network packet. For example, the NIC 120 may identify at least one characteristic of the received network packet that is usable to identify the network packet type. As described previously, in some embodiments, a header of the received network packet may include an indication of the network packet type; however, in other embodiments, additional and/or alternative characteristics may be used, such as a protocol associated with the received network packet, a workload of the network packet, a source/destination of the network packet, etc.

In block 306, the NIC 120 retrieves packet parsing rules based on the identified network packet type. As described previously, the packet parsing rules may include any type of instructions that are usable to identify fields that are to be extracted from a header of the received network packet, as well as the location in the header of each of the fields to be extracted. In block 308, the NIC 120 parses the received network packet to extract data from the header fields of the received network packet based on the retrieved packet parsing rules. In block 310, the NIC 120 inserts the data extracted from each of the header fields into a corresponding field in a field vector (see, e.g., the fields 402 of the field vector 400 of FIG. 4 described previously).

In block 312, the NIC 120 determines the input set based on the populated field vector. In other words, the NIC 120 determines the input set based on the data inserted into the respective fields of the field vector. In some embodiments, in block 314, the NIC 120 may determine the input set as a bit mask (see, e.g., the input bits 404 of the input set 406). Additionally, in block 316, the NIC 120 may determine the input set based on a maximum number of supported fields. In other words, the NIC 120 may compress the input set at the bit-level or the rule level, as previously described herein. In block 318, the NIC 120 retrieves a matching list from a plurality of matching lists (see, e.g., the matching list 502 of the plurality of matching lists 500 of FIG. 5). For example, in block 320, the NIC 120 may retrieve the matching list based on the identified network packet type.

Each matching list may include a number of rules (see, e.g., the rules 504 of the matching list 502 of FIG. 5), the priority of each rule predicated on the position of the rule in the matching list. In other words, the first rule in the matching list has the highest priority, the second rule in the list has the second highest priority, and so on. Furthermore, each rule may include a vector field identifier that indicates which field in the vector field, or more particularly in the input set derived therefrom, is to be compared against a data value of the rule. Each rule may additionally include a unique rule identifier that is usable to identify the rule (e.g., in the event of a match with the input set). Additionally, each rule includes an actionable instruction that indicates an action that is to be undertaken in the event of a match. For example, the actionable instruction may indicate that the NIC 120 is to include the rule identifier into metadata (e.g., the header of the network packet, a field in a descriptor associated with network packet, etc.), insert the received network packet into a particular processing queue (e.g., based on a flow/workload/etc.) to which the received network packet corresponds, etc. In block 322, the NIC 120 compares the determined input set against each rule of the retrieved matching list.

In block 324, the NIC 120 determines whether a rule matched the input set. If not, the method 300 branches to block 326, in which the NIC 120 performs a default action on the received network packet data (e.g., enqueue at least a portion the received network packet into a default packet processing queue). Otherwise, if the NIC 120 determines that a rule matched the input set in block 324, the method 300 branches to block 328. In block 328, the NIC 120 performs an action on the received network packet based on the first detected matching rule. It should be appreciated that, as described previously, the NIC 120 may be configured to find a single matching rule (e.g., the first rule that matches the input set) or any number of rules that match the input set. Accordingly, while described herein as matching a single matching rule, it should be further appreciated that the NIC 120 may, in other embodiments perform an action on the received network packet based on the set of matching rules, if applicable.

In an illustrative embodiment, the functionality described herein may be employed in mobile telecommunication/carrier architectures utilizing Control and User Plane Separation (CUPS). It should be appreciated that CUPS provides the architecture enhancements for the separation of functionality in the wireless and wireline networks and enables flexible network deployment and operation, by distributed or centralized deployment and the independent scaling between control plane and user plane functions. Control and User plane packets can be distinguished by multiple parameters, for example, packets will be on different VLANs, will have different DSCP/TOS in IP headers or will be separated by different L4 destinations ports. It should be further appreciated that doing Control/User Plane Separation in software typically requires a significant number of processor clock cycles for network packet parsing and classification, as hardware filters are generally required to offload such classification to the NIC 120. However, as described herein, it is possible to assign a prioritized matching list on a per filter basis, thereby minimizing the number of filters needed per compute device (e.g., the destination compute device 106) to perform network packet classification and separation of Control/User Plane network packets/flows.

EXAMPLES

Illustrative examples of the technologies disclosed herein are provided below. An embodiment of the technologies may include any one or more, and any combination of, the examples described below.

Example 1 includes a network interface controller (NIC) for filtering network traffic on ingress, the NIC comprising flow director circuitry to compare each matching set of a plurality of matching sets against an input set until a match between a corresponding portion of the input set matches a matching set of a plurality of matching sets, wherein the input set comprises a set of characteristics of a received network packet, and wherein each of the plurality of matching sets corresponds to a different possible characteristic of the received network packet; and perform, subsequent to a determination that the match has been found as a result of the comparison, an action on the received network packet based on an actionable instruction associated with the matching set of a plurality of matching sets that resulted in the match.

Example 2 includes the subject matter of Example 1, and further including field vector generation circuitry to (i) extract data from a plurality of header fields of a header a network packet received by the NIC; and (ii) insert the extracted data into a field vector, wherein the field vector includes a plurality of fields, and wherein each of the plurality of fields comprises a predetermined location in which to store a corresponding type of data, wherein the flow director circuitry is further to determine, subsequent to insertion of the extracted data into the field vector, the input set based on the field vector.

Example 3 includes the subject matter of any of Examples 1 and 2, and wherein the field vector generation circuitry is further to identify a type of the received network packet; and retrieve packet parsing rules from a plurality of packet parsing rules based on the identified type of the received network packet, wherein the packet parsing rules identify a type and location of each header field to be extracted, wherein to extract the data comprises to extract the data from the plurality of header fields of the header based on the packet parsing rules.

Example 4 includes the subject matter of any of Examples 1-3, and wherein to insert the extracted data into the field vector comprises to identify a type of the data extracted; and insert the extracted data into a corresponding field in the field vector based on the type of the data extracted.

Example 5 includes the subject matter of any of Examples 1-4, and wherein the flow director circuitry is further to compress the input set based on a maximum number of supported fields relative to a number of fields of the field vector.

Example 6 includes the subject matter of any of Examples 1-5, and wherein the plurality of rules of the matching list are ordered in the matching list based on a corresponding priority level, and wherein a first rule of the plurality of rules has a priority level that is higher than a priority level of each of the other rules of the plurality of rules of the matching list.

Example 7 includes the subject matter of any of Examples 1-6, and wherein to perform the action on the received network packet comprises to insert at least a portion of the received network packet into a packet processing queue based on the actionable instruction.

Example 8 includes the subject matter of any of Examples 1-7, and wherein to perform the action on the received network packet comprises to insert an identifier of the one of the plurality of rules that matches the corresponding portion of the input set into metadata associated with the received network packet.

Example 9 includes the subject matter of any of Examples 1-8, and wherein to insert the identifier into the metadata associated with the received network packet comprises to insert the identifier into a descriptor associated with the received network packet.

Example 10 includes the subject matter of any of Examples 1-9, and wherein the different possible characteristic of the received network packet includes one of a differentiated services code point (DSCP), a type of service (TOS), a virtual local area network (VLAN) identifier, or a network protocol.

Example 11 includes one or more machine-readable storage media comprising a plurality of instructions stored thereon that, in response to being executed, cause a network interface controller (NIC) to compare each matching set of a plurality of matching sets against an input set until a match between a corresponding portion of the input set matches a matching set of a plurality of matching sets, wherein the input set comprises a set of characteristics of a received network packet, and wherein each of the plurality of matching sets corresponds to a different possible characteristic of the received network packet; and perform, subsequent to a determination that the match has been found as a result of the comparison, an action on the received network packet based on an actionable instruction associated with the matching set of a plurality of matching sets that resulted in the match.

Example 12 includes the subject matter of Example 11, and wherein the plurality of instructions further cause the NIC to extract data from a plurality of header fields of a header a network packet received by the NIC; insert the extracted data into a field vector, wherein the field vector includes a plurality of fields, and wherein each of the plurality of fields comprises a predetermined location in which to store a corresponding type of data; and determine, subsequent to insertion of the extracted data into the field vector, the input set based on the field vector.

Example 13 includes the subject matter of any of Examples 11 and 12, and wherein the plurality of instructions further cause the NIC to identify a type of the received network packet; and retrieve packet parsing rules from a plurality of packet parsing rules based on the identified type of the received network packet, wherein the packet parsing rules identify a type and location of each header field to be extracted, wherein to extract the data comprises to extract the data from the plurality of header fields of the header based on the packet parsing rules.

Example 14 includes the subject matter of any of Examples 11-13, and wherein to insert the extracted data into the field vector comprises to identify a type of the data extracted; and insert the extracted data into a corresponding field in the field vector based on the type of the data extracted.

Example 15 includes the subject matter of any of Examples 11-14, and wherein the flow director circuitry is further to compress the input set based on a maximum number of supported fields relative to a number of fields of the field vector.

Example 16 includes the subject matter of any of Examples 11-15, and wherein the plurality of rules of the matching list are ordered in the matching list based on a corresponding priority level, and wherein a first rule of the plurality of rules has a priority level that is higher than a priority level of each of the other rules of the plurality of rules of the matching list.

Example 17 includes the subject matter of any of Examples 11-16, and wherein to perform the action on the received network packet comprises to insert at least a portion of the received network packet into a packet processing queue based on the actionable instruction.

Example 18 includes the subject matter of any of Examples 11-17, and wherein to perform the action on the received network packet comprises to insert an identifier of the one of the plurality of rules that matches the corresponding portion of the input set into metadata associated with the received network packet.

Example 19 includes the subject matter of any of Examples 11-18, and wherein to insert the identifier into the metadata associated with the received network packet comprises to insert the identifier into a descriptor associated with the received network packet.

Example 20 includes the subject matter of any of Examples 11-19, and wherein the different possible characteristic of the received network packet includes one of a differentiated services code point (DSCP), a type of service (TOS), a virtual local area network (VLAN) identifier, or a network protocol.

Example 21 includes a network interface controller (NIC) for filtering network traffic on ingress, the NIC comprising means for comparing each matching set of a plurality of matching sets against an input set until a match between a corresponding portion of the input set matches a matching set of a plurality of matching sets, wherein the input set comprises a set of characteristics of a received network packet, and wherein each of the plurality of matching sets corresponds to a different possible characteristic of the received network packet; and means for performing, subsequent to a determination that the match has been found as a result of the comparison, an action on the received network packet based on an actionable instruction associated with the matching set of a plurality of matching sets that resulted in the match.

Example 22 includes the subject matter of Example 21, and further including means for extracting data from a plurality of header fields of a header a network packet received by the NIC; and means for inserting the extracted data into a field vector, wherein the field vector includes a plurality of fields, and wherein each of the plurality of fields comprises a predetermined location in which to store a corresponding type of data; and means for determining, subsequent to insertion of the extracted data into the field vector, the input set based on the field vector.

Example 23 includes the subject matter of any of Examples 21 and 22, and further including means for identifying a type of the received network packet; and means for retrieving packet parsing rules from a plurality of packet parsing rules based on the identified type of the received network packet, wherein the packet parsing rules identify a type and location of each header field to be extracted, wherein the means for extracting the data comprises means for extracting the data from the plurality of header fields of the header based on the packet parsing rules.

Example 24 includes the subject matter of any of Examples 21-23, and wherein the means for inserting the extracted data into the field vector comprises (i) means for identifying a type of the data extracted and (ii) means for inserting the extracted data into a corresponding field in the field vector based on the type of the data extracted.

Example 25 includes the subject matter of any of Examples 21-24, and wherein the different possible characteristic of the received network packet includes one of a differentiated services code point (DSCP), a type of service (TOS), a virtual local area network (VLAN) identifier, or a network protocol.

The invention claimed is:

1. A network interface controller comprising:
circuitry to:
extract multiple fields of headers of a network packet received by the network interface controller;
access multiple matching sets, individual members of the matching sets having respective relative priorities, individual members associated with a respective action;
based on at least one of the multiple matching sets matching at least some of the multiple fields of headers, cause an action on the network packet associated with a matching set of the multiple matching sets;
insert the multiple fields of headers into a field vector, the field vector including a plurality of fields, each of the plurality of fields including a predetermined location in which to store a corresponding type of data; and
determine, subsequent to insertion of the multiple fields of headers into the field vector, the multiple fields of headers based on the field vector.

2. The network interface controller of claim 1, wherein the circuitry is further to:
identify a type of the network packet; and
retrieve packet parsing rules from a plurality of packet parsing rules based on the type of the network packet, the packet parsing rules to identify a type and location of each header field to be extracted, to extract the data from the multiple fields of headers based on the packet parsing rules.

3. The network interface controller of claim 1, wherein to insert the multiple fields of headers into the field vector comprises to:
identify a type of the data extracted; and
insert the multiple fields of headers into a corresponding field in the field vector based on the type of the data extracted.

4. The network interface controller of claim 1, wherein the circuitry is further to compress the multiple fields of headers based on a maximum number of supported fields relative to a number of fields of the field vector.

5. The network interface controller of claim 1, wherein a plurality of rules of a matching list are ordered in the matching list based on a corresponding priority level, and wherein a first rule of the plurality of rules has a priority level that is higher than a priority level of each of the other rules of the plurality of rules of the matching list.

6. The network interface controller of claim 5, wherein to cause the action on the network packet comprises to insert an identifier of a one of the plurality of rules that matches the corresponding portion of the multiple fields of headers into metadata associated with the network packet.

7. The network interface controller of claim 6, wherein to insert the identifier into the metadata associated with the network packet comprises to insert the identifier into a descriptor associated with the network packet.

8. The network interface controller of claim 1, wherein to cause the action on the network packet comprises to insert at least a portion of the network packet into a packet processing queue.

9. The network interface controller of claim 1, wherein different possible characteristic of the network packet includes one of a differentiated services code point (DSCP), a type of service (TOS), a virtual local area network (VLAN) identifier, or a network protocol.

10. One or more non-transitory computer readable storage media comprising a plurality of instructions stored thereon that, in response to being executed, cause a network interface controller to:
 extract multiple fields of headers of a network packet received by the network interface controller;
 access multiple matching sets, individual members of the matching sets having respective relative priorities, individual members associated with a respective action;
 based on at least one of the multiple matching sets matching at least some of the multiple fields of headers, cause an action on the network packet associated with a matching set of the multiple matching sets;
 insert the multiple fields of headers into a field vector, the field vector including a plurality of fields, each of the plurality of fields including a predetermined location in which to store a corresponding type of data; and
 determine, subsequent to insertion of the multiple fields of headers into the field vector, the multiple fields of headers based on the field vector.

11. The one or more non-transitory computer readable storage media of claim 10, wherein the plurality of instructions further cause the network interface controller to:
 identify a type of the network packet; and
 retrieve packet parsing rules from a plurality of packet parsing rules based on the type of the network packet, the packet parsing rules to identify a type and location of each header field to be extracted, to extract the data from the multiple fields of headers based on the packet parsing rules.

12. The one or more non-transitory computer readable storage media of claim 10, wherein to insert the multiple fields of headers into the field vector comprises to:
 identify a type of the data extracted; and
 insert the multiple fields of headers into a corresponding field in the field vector based on the type of the data extracted.

13. The one or more non-transitory computer readable storage media of claim 10, wherein the plurality of instructions further cause the network interface controller to:
 compress the multiple fields of headers based on a maximum number of supported fields relative to a number of fields of the field vector.

14. The one or more non-transitory computer readable storage media of claim 10, wherein a plurality of rules of a matching list are ordered in the matching list based on a corresponding priority level, and wherein a first rule of the plurality of rules has a priority level that is higher than a priority level of each of the other rules of the plurality of rules of the matching list.

15. The one or more non-transitory computer readable storage media of claim 14, wherein to cause the action on the network packet comprises to insert an identifier of a one of the plurality of rules that matches the corresponding portion of the multiple fields of headers into metadata associated with the network packet.

16. The one or more non-transitory computer readable storage media of claim 15, wherein to insert the identifier into the metadata associated with the network packet comprises to insert the identifier into a descriptor associated with the network packet.

17. The one or more non-transitory computer readable storage media of claim 10, wherein to cause the action on the network packet comprises to insert at least a portion of the network packet into a packet processing queue.

18. The one or more non-transitory computer readable storage media of claim 10, wherein different possible characteristic of the network packet includes one of a differentiated services code point (DSCP), a type of service (TOS), a virtual local area network (VLAN) identifier, or a network protocol.

19. A network interface controller comprising:
 means to extract multiple fields of headers of a network packet received by the network interface controller;
 means to access multiple matching sets, individual members of the matching sets having respective relative priorities, individual members associated with a respective action; and
 based on at least one of the multiple matching sets matching at least some of the multiple fields of headers, means to cause an action on the network packet associated with a matching set of the multiple matching sets wherein a plurality of rules of a matching list are ordered in the matching list based on a corresponding priority level, and wherein a first rule of the plurality of rules has a priority level that is higher than a priority level of each of the other rules of the plurality of rules of the matching list.

20. The network interface controller of claim 19, further comprising:
 means to insert the multiple fields of headers into a field vector, the field vector including a plurality of fields, each of the plurality of fields including a predetermined location in which to store a corresponding type of data; and
 means to determine, subsequent to insertion of the multiple fields of headers into the field vector, the multiple fields of headers based on the field vector.

21. The network interface controller of claim 20, further comprising:
 means to identify a type of the network packet; and
 means to retrieve packet parsing rules from a plurality of packet parsing rules based on the type of the network packet, the packet parsing rules to identify a type and location of each header field to be extracted, to extract the data from the multiple fields of headers based on the packet parsing rules.

22. The network interface controller of claim 20, wherein the means to insert the multiple fields of headers into a field vector comprises:
 means to identify a type of the multiple fields of headers; and
 means to insert the multiple fields of headers into a corresponding field in the field vector based on the type.

23. The network interface controller of claim 19, wherein different possible characteristic of the network packet includes one of a differentiated services code point (DSCP), a type of service (TOS), a virtual local area network (VLAN) identifier, or a network protocol.

* * * * *